United States Patent [19]

Dumbaugh, Jr. et al.

[11] 3,864,113

[45] Feb. 4, 1975

[54] METHOD OF PRODUCING GLASS BY FLAME HYDROLYSIS

[75] Inventors: William H. Dumbaugh, Jr.; Peter C. Schultz, both of Painted Post, N.Y.

[73] Assignee: Corning Glass Works, Corning, N.Y.

[22] Filed: Oct. 19, 1973

[21] Appl. No.: 407,917

[52] U.S. Cl. .............................. 65/60, 65/3, 65/4, 65/18, 65/DIG. 7, 117/46 FS, 117/123 A, 117/126 GF
[51] Int. Cl. ............................................ C03c 25/02
[58] Field of Search ...... 65/3, 4, 18, 30, 60, DIG. 7; 117/46 FS, 123 A, 126 GF

[56] References Cited
UNITED STATES PATENTS 3,535,890 10/1970 Hansen et al. ......................... 65/18
3,611,188 10/1971 Snitzer .............................. 65/DIG. 7
3,615,319 10/1971 Shonebarger .......................... 65/60 X
3,737,292 6/1973 Keck et al. ............................ 65/4 X

*Primary Examiner*—Robert L. Lindsay, Jr.
*Attorney, Agent, or Firm*—Clarence R. Patty, Jr.; Clinton S. Janes, Jr.

[57] ABSTRACT

A method of incorporating an additive or dopant oxide in a glass body produced by the flame hydrolysis technique. Particles of the primary glass former are produced by flame hydrolysis and deposited to form a porous body. This is impregnated with a vaporized dopant which condenses within the pores on cooling. The body is then thermally consolidated with the dopant dispersed therein.

9 Claims, 3 Drawing Figures

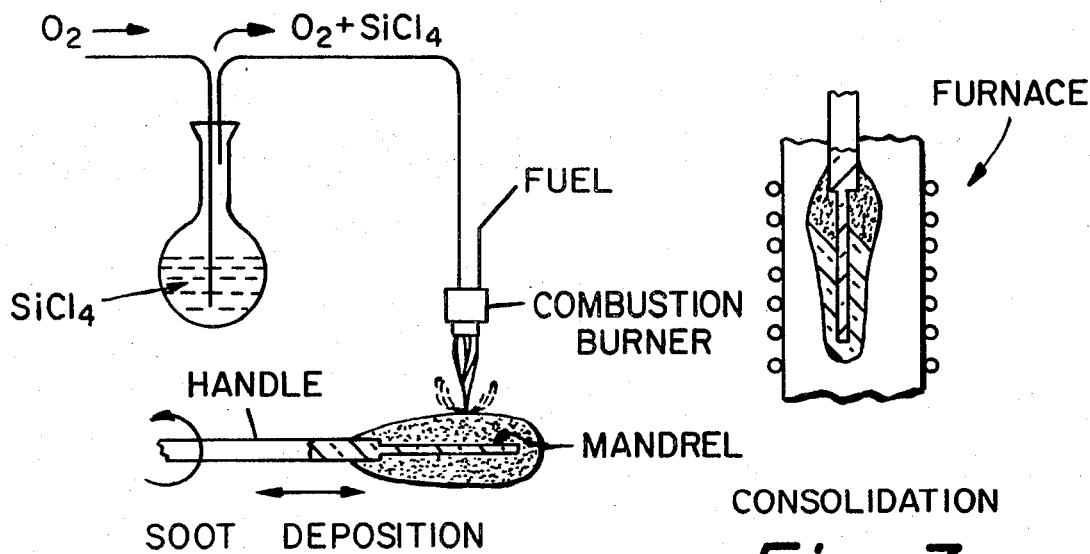
Fig. 1
Fig. 3
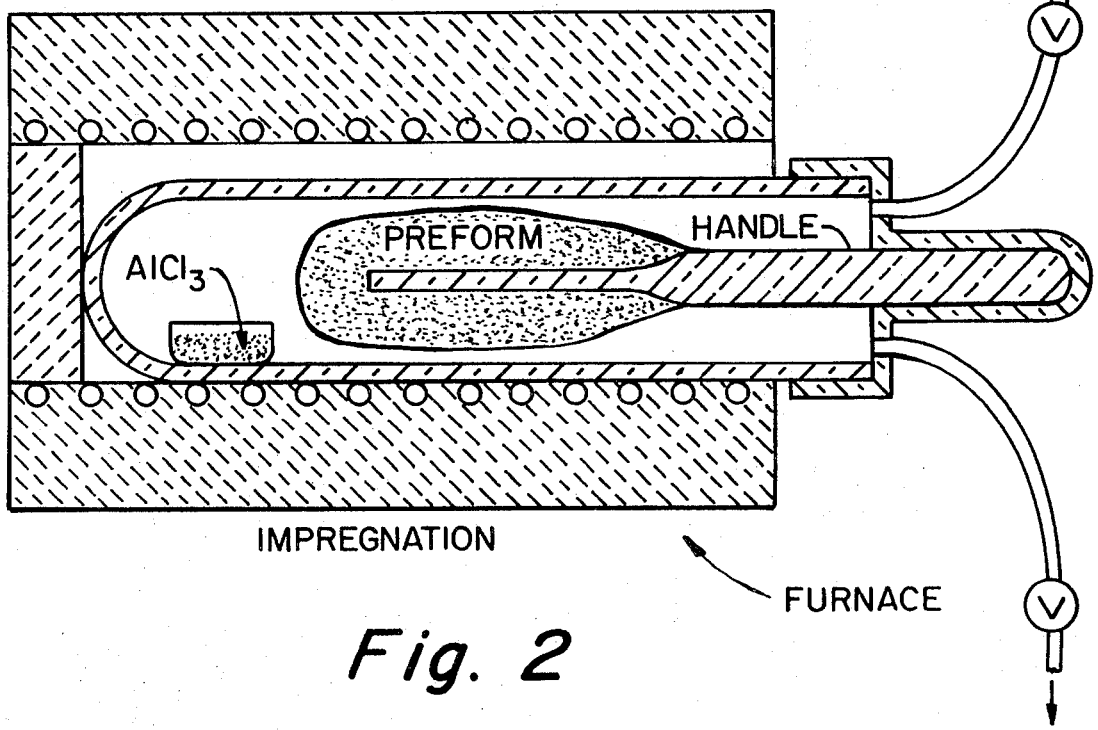
Fig. 2

METHOD OF PRODUCING GLASS BY FLAME HYDROLYSIS

The invention relates to a method of producing a glass body, such as a fused silica type glass body, by flame hydrolysis. It is especially concerned with a unique method of incorporating a dopant or additive oxide into such a glass body which is an alternative embodiment of the concept disclosed and claimed in a companion application, Ser. No. 407,918, filed of even date herewith by one of us and also entitled "Method of Producing Glass by Flame Hydrolysis".

U.S. Pat. No. 2,272,342, granted Feb. 10, 1942 to J. F. Hyde, describes the flame hydrolysis technique of producing glass with reference to the production of pure fused silica, that is a glass composed entirely of silica ($SiO_2$). As described by Hyde, a stream of gas carrying a hydrolyzable compound of silicon in vapor form is introduced into a flame of combustible gas. The compound of silicon is hydrolyzed to form amorphous silica which may be collected in particulate form, or may be deposited on a mandrel or other support as a preform. The preform may be consolidated in position, or by a separate heat treatment.

Subsequent U.S. Pat. Nos., including 2,326,059 granted Aug. 3, 1943 to M. E. Nordberg, and 2,239,551 granted Apr. 22, 1941 to R. H. Dalton et al., describe methods of producing glasses by flame hydrolysis wherein the glass is composed of an oxide mixture, in particular a fused silica type glass incorporating small amounts of one or more additional oxides such as titania or alumina. In general, these methods involve forming a mixture of volatile compounds in the desired proportions in a stream of gas fed to a combustion burner. The mixture of vapors is then hydrolyzed to deposit a glass or preform composed of a corresponding oxide mixture.

Mixed oxide glasses can be produced by these earlier methods, but it is frequently difficult to avoid condensation during delivery of vapors at an elevated temperature to a combustion flame. It may also be difficult to control relative rates of vaporization, and hence proportions in the final product.

The present invention provides a completely novel approach to the problem of introducing an oxide additive into a glass produced by flame hydrolysis, such as a fused silica type glass. Further, it provides a convenient means of introducing such additives in a uniform manner and in controlled amount. The invention is based on the discovery that oxide particles produced by the flame hydrolysis procedure can be deposited as a porous preform in which the particles have a strong cohesive bond to one another, but still provide a network of continuous open pores throughout the mass of the preform. It is further based on the discovery that this porous network can be uniformly impregnated with a desired dopant oxide, or compound convertible thereto, in the form of a condensible vapor.

The invention is a method of incorporating an oxide additive into a glass body produced by flame hydrolysis which comprises passing a volatile compound into a flame to produce the corresponding oxide in particulate form by hydrolysis of the volatile compound, depositing the oxide particles on a support as an integral preform having a network of continuous open pores throughout its mass, positioning such preform in a heated, enclosed space containing vapors of a condensible oxide additive, or a compound convertible thereto, to introduce such vapors into the pores of the preform, cooling the preform in the vapor atmosphere to condense the vapors in the pores, heat treating the preform to consolidate it into a non-porous glassy body composed of the oxide of hydrolysis containing the additive oxide dispersed throughout at least a portion of the body.

The invention is hereafter described in greater particularity with respect to fused silica type glasses, a preferred embodiment of present practical interest. However, it will be understood that the invention is not limited to this type of glass, but may be employed in the production of glasses based on other glass forming oxides. For example, a germania ($GeO_2$) preform can be deposited on a mandrel by flame hydrolysis of $GeCl_4$, and such porous body may be impregnated and thermally consolidated as hereafter described. The invention may also be applied to porous preforms produced from such oxides as $B_2O_3$, $P_2O_5$, $SeO_2$ and $TeO_2$.

The present invention contemplates producing oxide particles, or mixed oxides in particulate form, and depositing such particles to form a preform, in accordance with conventional practice as described in the patents mentioned earlier. Thus, as pointed out by Hyde, a suitable volatile silicon compound, such as one of the silicon halides, a silane, or a halogen derivative thereof, may be selected. A particularly suitable material is $SiCl_4$ which may be readily volatilized by heating in a water bath and passing a suitable carrier gas therethrough. The silicon chloride vapors may be carried into the combustion burner flame by a stream of oxygen. The flame is maintained at a sufficiently low temperature so that small spherical silica particles of about 0.1 micron diameter are formed which bond tightly together in a preform body to leave a network of continuous open pores throughout the structure of the body.

The companion application mentioned earlier discloses and claims a method wherein a porous preform is impregnated with a liquid material. In that method, the preform must be sufficiently coherent, that is have sufficient self-bonding, so that liquid entry does not cause physical disintegration of the preform. Accordingly, care must be taken to avoid a loose, fluffy preform that might slough off or fall apart during impregnation.

The present process has the distinct advantage that this problem of disintegration does not arise. Thus, only the usual care against mechanical shock that is taken during firing is required. However, a network of continuous pores is required for effective impregnation. This means that the particles in the preform cannot be so densely packed as to interfere with vapor entry into the preform during impregnation. In particular then, a substantial degree of incipient consolidation in the preform, that is collapse and closing of the pores to form a non-porous or closed-pore glassy mass, must be avoided.

There are several factors which may exert an influence on the preform development, and which must therefore be considered. Flame temperature is an important consideration of course. Also, the positioning of the mandrel or other preform carrier with respect to the flame. Finally, it is customary to rotate and translate the preform carrier during deposition, and these movements should be not only controlled but also maintained uniform in speed. Incipient consolidation may result from too hot a flame, from positioning of the mandrel and the preform too close to the flame, or from a movement of the mandrel that is either too slow or uneven. Tests have shown that a total porosity in the preform, as measured by mercury porosimetry, should be on the order of 75 percent for optimum processing. In general bodies having porosities less than 90 percent can be useful. Average pore size or diameter tends to decrease with more intense heat treatment and ultimately becomes zero as the body consolidates. Thus, as a general rule, pore diameter should not be less than 0.001 microns.

It may be noted that differential additive concentrations may be provided in different portions of a body by varying pore size or percentage. Thus, if an outer layer of the preform is deposited under more intense thermal conditions, it will have smaller pore size and will accept less impregnating vapor. In turn, this outer layer will have a lower concentration of additive. It will be apparent that the differential may be sharp or stepped, or it may be of a gradual or gradient nature. Also, condensed impregnant may be dissolved or otherwise removed from a surface layer for example to create a depleted condition and hence a differential concentration.

The process of the present invention is extremely versatile insofar as materials are concerned. The impregnant may be added either as the oxide, or as a compound thermally convertible to the oxide as by oxidation or decomposition. Essentially the only condition imposed on the impregnating material is that it thermally vaporizes at a temperature below the consolidation temperature of the preform, and then condense within the pores on cooling to ambient temperature.

The present vapor impregnation method provides several distinct advantages. As noted earlier, it does not require the degree of shock resistance required in the preform by the liquid impregnation method. More important though, it provides a higher degree of purity in many instances. For example, when aluminum chloride ($AlCl_3$) is dissolved in alcohol for impregnation purposes, other metal chlorides such as iron chloride may be present as impurities. No possibility of separation is available except preliminary material purification. In the present method, $AlCl_3$ may be completely volatilized at 200°C. while $FeCl_3$ has a vapor pressure of only $10^{-3}$ atmospheres at this temperature. Obviously then, the amount of iron chloride impurity accompanying aluminum chloride vapor impregnation by the present method is extremely small and normally insignificant.

Another advantage lies in temperature control. When a solid such as $AlCl_3$ is vaporized and mixed with a second vapor, such as $SiCl_4$, it is necessary to maintain the entire system above the highest vapor condensation temperature. Furthermore, such materials as $AlCl_3$ have a steep vapor pressure curve so that control of proportions by vapor pressure-temperature control becomes quite difficult. The present method avoids these problems by separating the vaporizing steps.

The impregnation step of the present method is normally conducted in a closed heating chamber. A container of the impregnant may be positioned in the bottom of the heating chamber while the preform is suspended or otherwise supported for free access of vapors. The chamber is then closed and heated to the temperature required for volatilization. Alternatively, the impregnating material may be generated outside the heating chamber and piped in, but this loses simplicity.

The closed chamber is held at the volatilization temperature a sufficient time to complete impregnation, and then cooled to condense the vapor in the pores of the preform. There is a tendency for preferential condensation on the chamber walls during normal cooling. Therefore, induced rapid cooling of the preform, as by a water cooled preform support, may be employed to counter this tendency.

Usually, the impregnating atmosphere is composed essentially completely of the impregnating vapor. Thus, the chamber may be swept with vapor, evacuated, or vented in suitable manner to insure substantial expulsion of ambient atmosphere and replacement by vapor. However, a partial pressure of air, nitrogen or other diluent gas may be maintained if it is desired to control the amount of impregnant introduced into the preform.

The heating chamber need not be tightly closed or sealed, but it is necessary to enclose the preform in an atmosphere of the impregnating vapor during the impregnation and for a sufficient time during cooling to insure condensation of vapors within the pores. In general, a tube or box type furnace is convenient, although other suitable equipment for any particular operation will be apparent.

It is possible to incorporate more than one material as additive. Thus, an impregnating atmosphere may contain two different vapors, for example a mixture of aluminum and zirconium chlorides. Alternatively, a body may be impregnated with one vapor, cooled, and later impregnated with a second vapor. In this embodiment, the second material must vaporize at a temperature below that at which the first material vaporizes.

Once the preform has been cooled to condense the vapor impregnant in the pores, it may then be fired or thermally consolidated in the usual manner. The oxide or salt incorporated by impregnation remains dispersed throughout the pores and is incorporated into the fused silica glass as the porous body is consolidated by the usual treatment. The sintering or consolidating heat treatment may be an overall heating of the preform body as disclosed in the patents mentioned above. Alternatively, the heat treating process described in Application Ser. No. 239,742, entitled "Method and Apparatus for Producing High Quality Fused Silica" and filed Mar. 30, 1972 in the names of J. S. Flamenbaum et al., may be employed. In accordance with this procedure, the porous body is subjected to a progressive heat treatment as by being slowly passed into or through a thermal zone in an inert atmosphere, such as helium, wherein consolidation takes place. This process has the advantage of minimizing gas inclusions in the body of the glass.

The invention is further described with reference to a specific embodiment as illustrated in the attached drawing wherein, FIG. 1 is a schematic illustration of the step of forming the porous preform, FIG. 2 is a schematic illustration of the impregnations step, and FIG. 3 is a schematic illustration of the preferred sintering or thermal consolidation step.

As shown in FIG. 1, a stream of carrier gas, in this case oxygen, is introduced into and passes through the volatile silicon compound, in this case $SiCl_4$. The vapors of the volatile compound are entrained by the carrier gas and the mixture passes through a tube leading to a combustion burner wherein the vapors of the volatile compound are hydrolyzed to form oxide particles. In accordance with the illustration of FIG. 1, the $SiCl_4$ vapors are hydrolyzed and form silica ($SiO_2$) particles in the flame of the burner.

As further illustrated in FIG. 1, a mandrel or support member, shown as a rod, is carried on the end of a handle which is adapted to be rotated and oscillated either manually or by suitable mechanical devices. Normally, the mandrel will be rotated at a controlled rate, and likewise will be oscillated or moved back and forth at a controlled rate so that the silica particles are deposited uniformly over the mandrel, and subsequently over the preform surface.

FIG. 2 illustrates a preferred form of the impregnation step. A container of impregnating material, shown as aluminum chloride, is placed within the furnace and the preform is suspended therein. The closed furnace is then heated to a temperature slightly above that required for vaporization of the impregnant and maintained at such temperature for a few minutes to insure thorough permeation of the preform. The furnace may of course be swept by vapor, be evacuated, or be vented in suitable manner to largely remove ambient atmosphere. In this regard a tube furnace is frequently more convenient. When the preform is fully permeated, the furnace may be cooled at a convenient rate to permit condensation of the vapor within the pores.

Finally, the impregnated and dried porous preform is introduced into a heating chamber to thermally consolidate the porous body and incorporate the impregnated oxide therein. In the case of a fused silica body, the heating chamber will normally be operated at about 1,450°C. In accordance with earlier procedures, the preform may be immediately and completely introduced into the heating chamber whereby uniform consolidation takes place throughout the entire body. However, there is a tendency for gas inclusions, commonly known as bubbles or seed, to occur to a large degree when this procedure is followed. Accordingly, it has been found preferable to progressively introduce the preform into a heat zone, and thereby progressively consolidate the body into a non-porous body in the manner illustrated in FIG. 3. It will be understood that the preform may be removed from the mandrel of other support prior to thermal consolidation, although usually it is more convenient to handle the preform while thus supported.

The invention is further described with respect to a specific illustrative example wherein a fused silica body was prepared with aluminum oxide ($Al_2O_3$) incorporated therein as an additive:

A large container of liquid silicon tetrachloride ($SiCl_4$) was maintained at a temperature of 25°C. while a stream of oxygen was bubbled therethrough at a rate of 3,700 cm./min. The mixture of oxygen and $SiCl_4$ vapors thus produced was carried through suitable tubing to a combustion burner in which a mixture of natural gas and oxygen was being burned, the natural gas and the oxygen being supplied at a rate of 0.4 cubic feet/minute each. The $SiCl_4$ vapors hydrolyzed in the flame to produce amorphous silica particles in the form of a soot which deposited on a fused quartz mandrel. The mandrel was a 9 inch length of tubing which had a 5 mm. outer diameter and was attached to a supporting rod having a ¾ inch outer diameter handle. This fused quartz mandrel was positioned approximately 7 inches from the burner and was simultaneously rotated and translated back and forth. The mandrel was rotated at a rate of 200 rpm and was translated or oscillated at a rate of 16 inches/minute. It was found that these particular rates provided a preform having a porosity of about 75 percent and optimum characteristics for impregnation.

A tubular type electric furnace was arranged in horizontal position, as shown in FIG. 2. This was provided with a sealed glass tubular heating chamber formed from a 96 percent silica glass. The glass tube rested against an insulating plug in one end of the furnace and terminated in a vacuum tight joint outside the other end. This terminal was provided with a short constricted extension into which the handle of the preform fit snugly to act as a support.

A sintered alumina dish containing about 30 grams of aluminum chloride ($AlCl_3$) powder was placed in the heating chamber and a porous silica preform, prepared as described above, mounted within the glass tube. The tube was then evacuated to a pressure of about 5 microns of mercury to remove gases from the pores of the silica preform. The vacuum was then cut off and the furnace heated to a temperature of 200°C., where the vapor pressures of the $AlCl_3$ is about 760 mm., and maintained at that temperature for one hour. During this time, a substantial amount of the $AlCl_3$ vaporized, filling the chamber as well as the pores of the preform with vapors. The furnace was then shut off and cooled to room temperature, during which time the $AlCl_3$ vapors condensed within the pore network of the preform as well as elsewhere in the chamber. When cool, the chamber was backfilled with nitrogen and the preform removed.

The thus impregnated preform was then slowly lowered through the hot zone (1,450°C.) of a helium atmosphere furnace, as illustrated in FIG. 3, to convert the $AlCl_3$ to alumina, and to consolidate the porous preform into a clear transparent non-porous glass body containing $Al_2O_3$ uniformly distributed throughout its mass. Chemical analysis showed an $Al_2O_3$ content of 0.85 percent.

It will be understood that the amount of impregnant vapor condensed in the pores may be increased by preferential cooling of the preform as mentioned earlier. Likewise, a wide variety of metal salts may be employed in accordance with the present invention. The essential requirement is ability to vaporize within the temperature capabilities of the system and below the temperature of incipient consolidation in the preform, and then condense in cooling.

We claim:

1. A method of incorporating an oxide additive into a glass body produced by flame hydrolysis which comprises passing a hydrolyzable compound of $SiO_2$, $B_2O_3$, $GeO_2$, $P_2O_5$, $SeO_2TeO_2$, or a mixture thereof in vapor form into a flame to produce the corresponding oxide in particulate form by hydrolysis of said compound, depositing the oxide particles on a support as an integral preform having a network of continuous open pores throughout its mass, said porosity being less than about 90 percent and said pores having a diameter not less than about 0.001 micron, positioning said preform in a heated, enclosed space containing vapors of an oxide additive, or a compound convertible thereto, which thermally vaporizes at a temperature below the consolidation temperature of the preform, to introduce such vapors into the pores of the preform, cooling the preform in the said vapors to condense the vapors in the pores, heat treating the preform to consolidate it into a non-porous glassy body composed of the oxide of hydrolysis containing the additive oxide dispersed throughout at least a portion of the body.

2. A method in accordance with claim 1 wherein the volatile compound passed into the flame is a compound of silicon and a preform composed of silica is formed.

3. A method in accordance with claim 1 wherein a mixture of volatile compounds is passed into a flame to form a mixture of the corresponding oxides in particulate form.

4. A method in accordance with claim 1 wherein said porous preform also contains $TiO_2$, $Al_2O_3$, $ZrO_2$, or mixtures thereof.

5. A method in accordance with claim 1 wherein the preform is positioned in a heating chamber, the chamber is evacuated and sealed, and the chamber is then heated to vaporize the condensible additive.

6. A method in accordance with claim 5 wherein the chamber is heated to a temperature at which the vapor pressure of the condensible additive is approximately 760 mm. mercury.

7. A method in accordance with claim 1 wherein the preform is deposited under varying thermal conditions to vary pore size in the porous network.

8. A method in accordance with claim 1 wherein the preform is impregnated with a plurality of condensible vapors.

9. A method in accordance with claim 1 wherein the condensible vapor additive is a chloride.

* * * * *